110-90.   AU 115      EX
2-18-75    OR    3,867,160

United States Patent [19]
Cooper

[11] 3,867,160
[45] Feb. 18, 1975

[54] N-HETEROCYCLIC COMPOUNDS AS ADDITIVES TO CEMENT SYSTEMS

[75] Inventor: Ronald H. Cooper, Midland, Mich.

[73] Assignee: The Dow Chemical Company, Midland, Mich.

[22] Filed: Mar. 26, 1973

[21] Appl. No.: 345,227

[52] U.S. Cl. ............... 106/90, 106/119, 106/287 SS
[51] Int. Cl. ............................................... C04b 7/02
[58] Field of Search ................. 106/90, 119, 287 SS

[56] References Cited
UNITED STATES PATENTS

| 2,768,089 | 10/1956 | Erickson | 106/287 |
|---|---|---|---|
| 3,138,610 | 6/1964 | Buc | 260/309.6 |
| 3,359,225 | 12/1967 | Weisend | 260/29.6 |

OTHER PUBLICATIONS

Kirk-Othmer, Encyclopedia of Chemical Technology, Second Ed., 1968, Vol. 16, pp. 772–773.

*Primary Examiner*—Delbert E. Gantz
*Assistant Examiner*—John P. Sheehan
*Attorney, Agent, or Firm*—Albin R. Lindstrom

[57] ABSTRACT

A method of producing improved cement mortar, concrete, soil-cement and soil-lime systems which exhibit the properties of increased strength, decreased water absorption or enhanced resistance to scaling. This is accomplished by admixing into the system a small amount of a N-heterocyclic compound.

5 Claims, No Drawings

N-HETEROCYCLIC COMPOUNDS AS ADDITIVES TO CEMENT SYSTEMS

BACKGROUND OF THE INVENTION

The need for materials which will prevent deterioration of cement or concrete structures and systems as well as soil-cement and soil-lime systems is apparent from the many anti-spalling and waterproofing agents taught in the literature. The prior art includes methods of post-treatment of cement or concrete with emulsions of linseed oil resinous materials or solvent diluted epoxy resins. One commercial material, a water insoluble calcium stearate, is sold as a water absorption control agent which can be admixed into the cement mixture.

Other chemicals known to be active waterproofing agents are silicone, alkyl catechols, benzoquinones, alkyl-2-aminophenols and long chain alkyl quaternary amines.

It is an object of this invention to provide a method for soil-cement and soil-lime systems that increase the strength and decrease the water absorption of said systems. It is a further object to provide a method for cement mortar or concrete systems that improves the resistance to scaling of the systems.

SUMMARY OF THE INVENTION

The present invention arises from the discovery that certain pyrazolone compounds enhance the strength, anti-scaling properties and water absorption resistance of cement mortar, concrete, soil-cement and soil-lime systems.

These N-heterocyclic compounds are selected from a group consisting of pyrazolones having the formula:

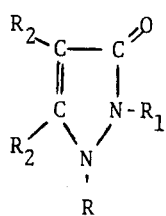

I or

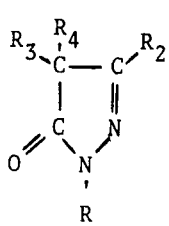

II or pyrazolidine-3,5 diones having the formula

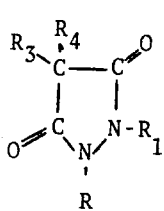

III wherein R and $R_1$ independently may be hydrogen or an organic substituent with at least one of said R and $R_1$ being organic substituent; $R_2$ may be hydrogen or an organic substituent; and $R_3$ and $R_4$ independently may be hydrogen or an organic substituent or $R_3$ and $R_4$ may be one organic substituent connected to the carbon atom by a double bond or IV the enol form of any of the above compounds.

Typical of the useful compounds are
1. 4-(2-Methoxy-5-nitrophenylazo)-1,3-diphenyl-2-pyrazoline-5-one;
2. 4-(x-(2,5-dichlorophenylazo)salicylidiene)-1,3-diphenyl-2-pyrazolin-5-one;
3. 5-Oxo-3-phenyl-2-pyrazoline-1-thiocarboxamide;
4. 4-Isopropylidene-1,2-diphenyl-3,5-pyrazolidinedione;
5. 3,5-Dioxo-1,2-diphenyl-4-pyrazolidinecarboxanilide;
6. 1,2-Diphenyl-3,5-pyrazolidinedione;
7. 4-Acetonyl-1,2-diphenyl-3,5-pyrazolidinedione;
8. 4-((Dimethylamino)methyl)-3-hydroxy-1,2-diphenyl-3-pyrazolin-5-one, sodium derivative;
9. x,x'-Diacetyl-3,3'-dimethyl-1,1'-diphenyl-(4,4'-bi-2-pyrazoline)-5,5'-dione;
10. 2-(2-(Phenylthio)ethyl)-1H-benzo(c)pyrazolo(1,2-a)cinnoline-1,3(2H)-dione;
11. 3-(m-Nitrophenyl)-1-phenyl-2-pyrrolin-5-one.

In carrying out this invention the n-heterocyclic is admixed into the cement mortar, concrete, soil-cement or soil-lime system; all other normal procedures remain unchanged. The admixing can be accomplished by various methods, but two preferred embodiments are either admixing the dry, powdered n-heterocyclic compound with the dry constituents of the system or dissolving the n-heterocyclic compound and adding the so dissolved compound to the remaining constituents of the system.

It is believed that the n-heterocyclic compounds improve the cement mortar, concrete, soil-cement and soil-lime systems by interaction with the calcium ion present therein. This probably reduces the wetting angle and yields a surface which in effect is covered with hydrophobic R groups.

In concrete and cement mortar systems it has been discovered that the n-heterocyclic compounds are generally most effective in an amount from about 0.10 percent to about 0.50 percent based upon dry cement or concrete weight. In soil-cement and soil-lime systems the optimum amounts of n-heterocyclic compound is from about 0.025 percent to about 0.50 percent based on dry soil weight.

This group of n-heterocyclic compounds can be used effectively in many types of soil-cement, soil-lime, cement mortar and concrete systems, including, for example, latex cements.

The following examples illustrate the present invention and the manner by which it can be practiced but, as such, should not be construed as limitations upon the overall scope of the same.

EXAMPLE 1

Dried silty clay soil, 497.6 grams (g.) (Code No. 13C) was mixed with 19.2 g. of portland cement. This mixture was wetted for compaction by spraying 61.4 g. of water into the admixture while subjecting it to further mixing. After a uniform admix was obtained, 85 g. aliquots were placed in a cylindrical molding tube 3 centimeters (cm.) in diameter and compressed from both ends in a hydraulic press at a pressure of 740 pounds per square inch (psi) until a static condition was attained. The molded specimen was then ejected from the molding tube and placed in a 100 percent relative humidity (R.H.) atmosphere at 73°F for fourteen and twenty-eight day cures. This resulted in a series of soil-cement specimens (3 cm. × 6 cm.) containing 4 percent portland cement based on the dry weight of soil.

This procedure was repeated except that the appropriate quantity of pyrazolone was dissolved in acetone, added to the water and sprayed onto the soil-cement mixture. In this manner identical specimens as above were produced containing various percentages of the pyrazolone compounds.

After curing the specimens they were allowed to stand for one day at room temperature and conditions; then they were soaked in water for twenty four hours. Next, the core strengths of the immersed specimens were tested on a Soiltest U-160 unconfined compressive strength tester. The cores were loaded through their primary axis at a rate of 0.07 inch per minute. The maximum load supported was divided by the cross sectional area to give the immersed unconfined compressive strengths shown in Table I.

TABLE I

Unconfined Compressed Immersed Strengths
of
Modified Soil-Cement Systems

| Compound | Percentage | Unconfined Compressed Immersed Strength (psi) | Increased Strength over Control, Times Greater |
|---|---|---|---|
| Control | None | 30 | — |
| 1 | 0.10 | 81 | 2.7 |
| 2 | 0.10 | 85 | 2.8 |
| 3 | 0.10 | 97 | 3.2 |
| 3 | 0.05 | 89 | 2.9 |
| 4 | 0.10 | 74 | 2.4 |
| 5 | 0.10 | 74 | 2.4 |
| 6 | 0.10 | 88 | 2.9 |
| 6 | 0.05 | 53 | 1.8 |
| 6 | 0.025 | 51 | 1.7 |
| 7 | 0.10 | 81 | 2.7 |
| 7 | 0.05 | 52 | 1.7 |
| 8 | 0.10 | 70 | 2.3 |
| 9 | 0.10 | 54 | 1.8 |
| 10 | 0.10 | 63 | 2.1 |
| 11 | 0.10 | 54 | 1.8 |

The increased strengths of the treated specimens are generally associated with a decrease in moisture content; hence the ability of these pyrazolone compounds to inhibit moisture absorption in soil-cement or soil-lime systems is established.

EXAMPLE 2

To 1 part of cement was added 2.75 parts of graded, standard sand by weight (ASTM designation:C-10-9-64). The mixing was done mechanically in a mix-muller in accordance with the ASTM procedure given in section 6 of Method C-305-64T. The cement mortar mix consisted of 500 g. portland cement, 1375 g. graded sand and 240 g. of water. The mixing water was placed in the mixing bowl, followed by cement, powdered pyrazolone and sand while subjecting the mixture to mixing according to C-305-64T procedure. The cement mortar was placed into two 3-gang, 2-inch cube molds according to ASTM procedure C-109-64. The specimens were covered with a wet cloth and allowed to harden overnight at room temperature. They were removed and placed in a 100 percent R.H. atmosphere for 14- and 28-day cures followed by air drying at 50 percent R.H., 73°F, for 24 hours.

The cubes were then subjected to slow freeze-thaw tests according to ASTM procedure C-292. The dried cubes were covered with a 3 percent NaCl solution to a depth of about one-half inch above the cubes. After twenty-four hours of soaking the cubes were drained, washed with fresh water, wiped dry and weighed. They were again covered with the 3 percent NaCl solution to a depth of about one-half inch over the cubes and placed in a freezer at 0°F overnight. Next, the cubes were thereafter allowed to thaw in the brine solution at room temperature whereupon the above procedure was repeated. Every five cycles data was taken and fresh brine introduced.

Table II shows the curability of the cement on concrete system cubes, at the rating intervals the cubes were visually noted according to the scale and system taken from Axon, et al., "Laboratory Freeze-Thaw Tests vs. Outdoor Exposure Tests," *Highway Research Record*, No. 268, August, 1969, p. 35.

The marked reduction in scaling in the modified cement on concrete systems proves the utility of these pyrazolone compounds as scale inhibitors without significant increase in brine absorption.

The cement used in all the preceding examples was Portland Cement Type I.

What is claimed is:

1. A method of producing improved cement mortar, concrete, soil-cement and soil-lime systems which comprises admixing into the system a N-heterocyclic compound selected from the group consisting of a pyrazolone having the formula

TABLE II

Durability of Pyrazolone Cement Mortar Cubes
During Slow Freeze-Thaw Cycles

| | Scale Rating* 14 Day Cure | | | | | | |
|---|---|---|---|---|---|---|---|
| Number of Cycles | 1 | 3 | 5 | 10 | 15 | 20 | 30 |
| Unmodified | 0 | 0 | ½ | 1 | 2 | 3 | 4 |
| (2) at 0.10% | 0 | 0 | 0 | 0 | 0 | ½ | ½ |
| (2) at 0.25% | 0 | 0 | 0 | 0 | 0 | 0 | ½ |
| (3) at 0.10% | 0 | 0 | 0 | 0 | 0 | ½ | ½ |
| (3) at 0.25% | 0 | 0 | 0 | 0 | 0 | 1 | 1 |
| Air Entrained | 0 | 0 | 0 | 0 | ½ | 1 | 2 |

TABLE II—Continued

Durability of Pyrazolone Cement Mortar Cubes During Slow Freeze-Thaw Cycles

| Number of Cycles | 1 | 3 | 5 | 10 | 15 | 20 | 25 | 30 | Scale Rating* 28 Day Cure 35 | 40 | 50 | 60 | 70 | 80 | 90 | 100 | 110 | 130 |
|---|---|---|---|---|---|---|---|---|---|---|---|---|---|---|---|---|---|---|
| Unmodified | 0 | 0 | 0 | ½ | 1 | 2 | 2 | 3 | 3 | 3 | 3 | 3 | 3 | 3 | 4 | 4 | 4 | 4 |
| (2) at 0.10% | 0 | 0 | 0 | 0 | 0 | 0 | 0 | 0 | 0 | 0 | ½ | 1 | 1 | 2 | 2 | 2 | 2 | 3 |
| (2) at 0.25% | 0 | 0 | 0 | 0 | 0 | ½ | ½ | ½ | ½ | ½ | ½ | ½ | ½ | ½ | ½ | ½ | ½ | 1 |
| (3) at 0.10% | 0 | 0 | 0 | 0 | ½ | ½ | ½ | ½ | ½ | ½ | 1 | 1 | 1 | 1 | 2 | 3 | 3 | 3 |
| (3) at 0.25% | 0 | 0 | 0 | 0 | 0 | 0 | 0 | ½ | ½ | ½ | ½ | ½ | 1 | 1 | 1 | 2 | 2 | 3 |
| Air Entrained | 0 | 0 | 0 | 0 | 0 | 1 | 2 | 3 | 3 | 3 | 3 | 3 | 3 | 4 | 4 | 4 | 4 | 2 |

*Scale Rating
0 = No scale
1 = Slight scale
2 = Slight to Moderate scale
3 = Moderate scale
4 = Moderate to heavy scale
5 = Heavy scale

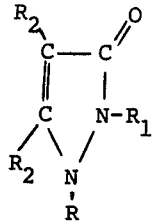

or

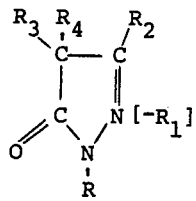

or a 3,5 pyrazolidindione having the formula

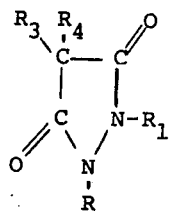

wherein R and $R_1$ independently may be hydrogen or an organic substituent with at least one of said R and $R_1$ being organic substituent; $R_2$ may be hydrogen or an organic substituent; and $R_3$ and $R_4$ independently may be hydrogen or an organic substituent or $R_3$ and $R_4$ may be one organic substituent connected to the carbon atom by a double bond or IV the enol form of any of the above compounds.

2. A method as in claim 1 wherein the system is soil-cement or soil-lime and the n-heterocyclic compound is added in an amount from about 0.025 percent to about 0.50 percent, based upon dry soil weight.

3. A method as in claim 1 wherein the system is cement mortar or concrete and the n-heterocyclic compound is added in an amount from about 0.10 percent to about 0.50 percent, based upon dry cement or concrete weight.

4. A method as in claim 1 wherein the n-heterocyclic compound is admixed into the system by admixing the dry, powdered n-heterocyclic compound with the dry constituents of the system.

5. A method as in claim 1 wherein the n-heterocyclic compound is admixed into the system by dissolving the n-heterocyclic compound and adding the so dissolved compound to the remaining constituents of the system.

* * * * *